(12) United States Patent
Ragnone et al.

(10) Patent No.: US 7,696,656 B2
(45) Date of Patent: Apr. 13, 2010

(54) MOTOR ASSEMBLY INCORPORATING A SECURELY POSITIONED ELECTROMAGNETIC DISTURBANCE SUPPRESSION DEVICE

(75) Inventors: Rocco Ragnone, Brighton, MI (US); Aron Rozenberg, Oak Park, MI (US); David Lightfoot, Highland, MI (US); Lawrence Johnson, Sterling Heights, MI (US)

(73) Assignee: Calsonickansei North America, Inc., Farmington Hills, MI (US)

( * ) Notice: Subject to any disclaimer, the term of this patent is extended or adjusted under 35 U.S.C. 154(b) by 341 days.

(21) Appl. No.: 11/961,274

(22) Filed: Dec. 20, 2007

(65) Prior Publication Data

US 2009/0160268 A1 Jun. 25, 2009

(51) Int. Cl.
*H02K 5/24* (2006.01)
*H02K 11/00* (2006.01)
*H01R 13/648* (2006.01)

(52) U.S. Cl. .............................. 310/51; 310/71; 439/95

(58) Field of Classification Search .................... 310/51, 310/68 B, 68 R, 71, 239, 400, 416; 439/76.1, 439/92, 95, 96, 108, 598, 607.45, 602.2
See application file for complete search history.

(56) References Cited

U.S. PATENT DOCUMENTS

| | | | |
|---|---|---|---|
| 5,717,270 A * | 2/1998 | Lau et al. ..................... | 310/220 |
| 5,734,212 A * | 3/1998 | Uffelman ..................... | 310/51 |
| 6,580,194 B2 * | 6/2003 | Mizutani et al. ............. | 310/239 |
| 6,768,243 B1 * | 7/2004 | Yamazaki et al. ........... | 310/239 |
| 6,858,955 B2 | 2/2005 | Lau | |
| 6,888,062 B1 | 5/2005 | Erickson et al. | |
| 7,018,240 B2 * | 3/2006 | Bourdykina et al. ... | 439/620.02 |
| 7,141,899 B2 | 11/2006 | Anthony et al. | |

FOREIGN PATENT DOCUMENTS

| JP | 07099754 A | * | 4/1995 |
|---|---|---|---|
| JP | 2001008414 A | * | 1/2001 |

* cited by examiner

*Primary Examiner*—Tran N Nguyen
(74) *Attorney, Agent, or Firm*—Meschkow & Gresham, PLC

(57) ABSTRACT

A motor assembly (20) includes a motor (22) and an end cap (26). The end cap (26) includes an electrically insulating body (28) having a peripheral edge (30) that interfaces with a conductive housing (24) of the motor (22). Motor terminals (94, 102) and an electromagnetic suppression (EMD) chip device (54) are located within the body (28). The chip device (54) has an input terminal (74) in electrical communication with the motor terminal (94), an input terminal (76) in electrical communication with the motor terminal (102), and an earth terminal (78). A conductive ground strap (56) is in electrical communication with the earth terminal (78). The ground strap (56) encapsulates and retains the chip device (54) in the end cap (26) and has an end (60) fitted onto the peripheral edge (30) of the end cap (26) between the end cap (26) and the conductive housing (24) of the motor (22).

20 Claims, 4 Drawing Sheets

MOTOR ASSEMBLY INCORPORATING A SECURELY POSITIONED ELECTROMAGNETIC DISTURBANCE SUPPRESSION DEVICE

TECHNICAL FIELD OF THE INVENTION

The present invention relates to the field of electric motors. More specifically, the present invention relates to electric motors having reduced electromagnetic disturbance characteristics.

BACKGROUND OF THE INVENTION

Electric motors are a significant source of radiated and conducted electromagnetic emissions, referred to herein as electromagnetic disturbance (EMD), which can degrade the performance of a device, equipment, or system. EMD can be radiated and conducted through electrical lines from sources such as the motor, electronic devices, and the like. Controlling conducted and radiated emissions produced by different electrical and electronic devices, including electric motors, is critical for protecting electronic equipment in the surrounding environment.

Many electric motor assemblies include EMD suppression components such as capacitors and inductors mounted within the motor itself. However, as packaging space becomes more limited, it has become increasingly difficult to package these components within the motor housing. Moreover, as electromagnetic interference (EMI) requirements are becoming more strict, improved EMD suppression is required.

EMD suppression chip devices have been developed to mitigate some of the problems of the prior art. An EMD suppression chip device is a generally rectangular prism element that can be located inside the motor housing and is capable of suppressing noise generated by the electric motors. An EMD suppression chip device has two input terminals, respectively connectable to the two motor terminals, and at least one earth terminal electrically connectable to a conductive ground path.

A problem associated with the incorporation of an EMD suppression chip device into a motor assembly is that of securing the EMD suppression chip device, especially in a high vibration environment. For example, when the motor assembly is in a vehicle, the motion and vibration of the vehicle can cause the EMD suppression chip device to move or vibrate out of contact with one or both motor terminals and/or the ground path. Of course, should the EMD suppression chip device become disconnected from the motor terminals and/or the ground path, its ability to suppress noise generated by the motor is severely compromised. Thus, what is needed is a motor assembly incorporating a securely positioned EMD suppression chip device for electromagnetic disturbance suppression.

SUMMARY OF THE INVENTION

Accordingly, it is an advantage of the present invention that a motor assembly is provided having an electromagnetic disturbance (EMD) suppression chip device for electromagnetic disturbance suppression.

It is another advantage of the present invention that a motor assembly is provided having an EMD suppression chip device that is securely positioned within an end cap of the motor assembly.

The above and other advantages of the present invention are carried out in one form by a motor assembly comprising a motor having a conductive housing and an end cap coupled to the motor. The end cap includes a body formed from insulating material, the body having a peripheral edge that interfaces with the conductive housing. A first motor terminal and a second motor terminal are located in the body. An electromagnetic disturbance (EMD) suppression chip device is located in the body. The EMD suppression chip device has a first input terminal, a second input terminal, and an earth terminal. The first input terminal is in electrical communication with the first motor terminal, and the second input terminal is in electrical communication with the second motor terminal. A conductive ground strap is in electrical communication with the earth terminal. The conductive ground strap has a first end retaining the chip device in the end cap and a second end fitted onto the peripheral edge of the end cap between the end cap and the conductive housing of the motor.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The present invention entails a motor assembly having electromagnetic disturbance (EMD) suppression. EMD may be radiated and conducted as known to those skilled in the art. The motor assembly can be utilized in a multiplicity of applications and environments, but is particularly suited for use in a high movement or vibration environment, such as in a vehicle.

Figure 1:
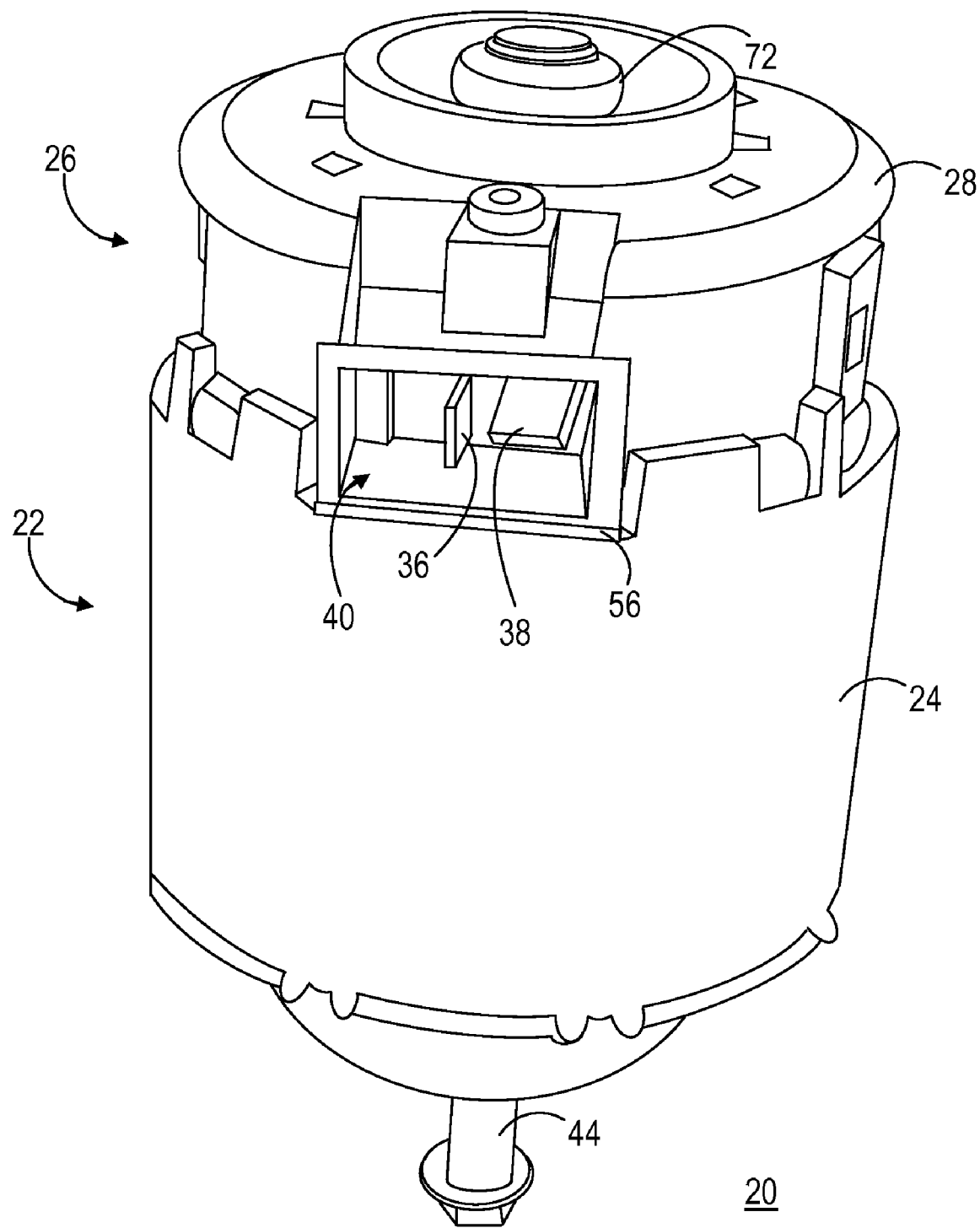
FIG. 1 shows a perspective view of a motor assembly in accordance with the present invention.

FIG. 1 shows a perspective view of a motor assembly 20 in accordance with the present invention. Motor assembly 20 includes a motor 22 having an electrically conductive housing 24 and an end cap 26 coupled to motor 22. End cap 26 includes a body 28 having a peripheral edge 30 (best seen in FIG. 2) that interfaces with conductive housing 24 of motor 22. Motor 22 may be a direct current (DC) brush type blower motor for a vehicle. However, it should be understood that motor 22 may alternatively be any of a number of motors, such as, but not limited to, a motor for operating windshield wipers, electric windows, sunroofs, electric adjustable mirrors, retractable antennas, fluid pumps, and the like.

Figure 2:
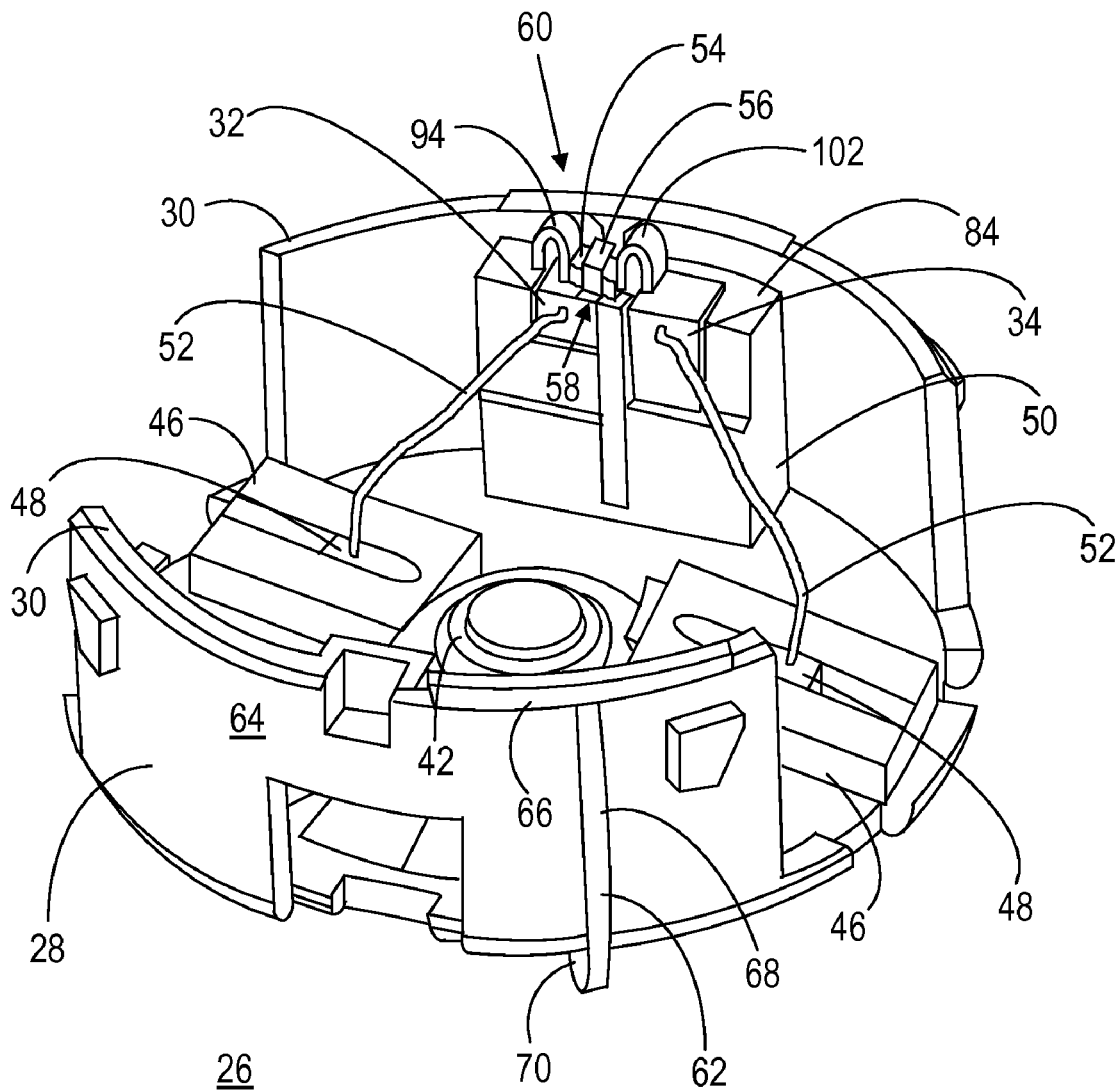
FIG. 2 shows an inside perspective view of an end cap of the motor assembly of FIG. 1.

In the embodiment shown in FIG. 1, motor 22 is a two phase motor having a positive motor terminal 32 (see FIG. 2)

and a negative motor terminal 34 (see FIG. 2). A prong 36 of positive motor terminal 32 and a prong 38 of negative motor terminal 34 extend from a receptacle portion 40 of end cap 26. Prongs 36 and 38 are configured for connection with a power supply (not shown).

Referring to FIGS. 1-2, FIG. 2 shows an inside perspective view of end cap 26 of motor assembly 20. Body 28 of end cap 26 is formed from an electrically insulating material and may be fabricated by, for example, a plastics injection molding process. End cap 26 has a support 42 for a bearing for a shaft 44 (visible in FIG. 1) of motor 22, supports 46 for brushes 48 that make sliding contact with a motor commutator (not shown), and a support 50 for positive and negative motor terminals 32 and 34, respectively. Conductors 52 interconnect respective ones of brushes 48 with respective ones of positive and negative motor terminals 32 and 34.

An electromagnetic disturbance (EMD) suppression chip device 54 is positioned on support 50 between positive and negative motor terminals 32 and 34. An electrically conductive ground strap 56 is constructed and arranged inside end cap 26 to encapsulate and securely position EMD suppression chip device 54. Ground strap 56 has a first end 58 coupled to support 50 and a second end 60 fitted onto peripheral edge 30 of end cap 26. A second electrically conductive ground strap 62 is constructed and arranged on an outer surface 64 of end cap 26. More specifically, second conductive ground strap 62 has a first end portion 66 fitted onto peripheral edge 30 of end cap 26, an intermediate portion 68 extending along outer surface 64 of end cap 26, and a second end portion 70 in electrical communication with an outside diameter bearing surface 72 (partially visible in FIG. 1) of motor 22.

When end cap 26 is coupled to housing 24 of motor 22, EMD suppression chip device 54 is largely inaccessible from the exterior of end cap 26. In addition, when end cap 26 is coupled to housing 24 of motor 22, ground strap 56 and ground strap 62 are interposed, or pinched, between end cap 26 and conductive housing 24 of motor 22. A portion of ground strap 56 pinched between end cap 26 and conductive housing 24 is visible in FIG. 1. Housing 24 acts as an electrical ground, and is grounded to the structure, such as a vehicle, in which motor assembly 20 is housed. Ground strap 56 provides a ground path from EMD suppression chip device 54 to ground, and ground strap 62 enhances the performance of EMD suppression chip device 54. Although ground strap 62 is illustrated as a separate component, ground strap 62 may alternatively be placed in an injection mold prior to molding body 28 of end cap 26. That is, ground strap 62 could be insert molded into end cap 26.

Figure 3:
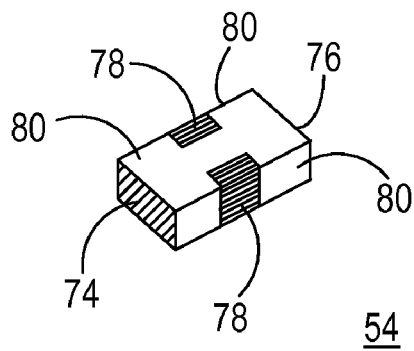
FIG. 3 shows a perspective view of an electromagnetic disturbance (EMD) suppression chip device used in the motor assembly.

FIG. 3 shows a perspective view of EMD suppression chip device 54 used in motor assembly 20 (FIG. 1). EMD suppression chip device 54 may be a small rectangular prism noise suppression chip device having a four terminal layered architecture. As such, EMD suppression chip device 54 includes a first input terminal 74 and a second input terminal 76 located at opposing axial ends of chip device 54. Two earth terminals 78 are located on longitudinal surfaces 80 of EMD suppression chip device 54 approximately midway between the axial ends.

Figure 4:
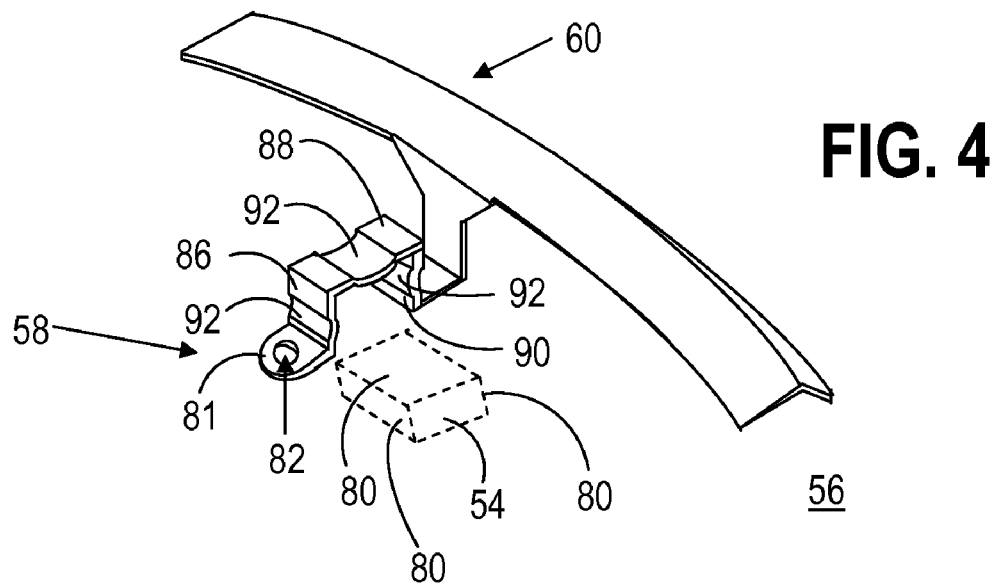
FIG. 4 shows a perspective view of a ground strap for securing the EMD suppression chip device in the end cap.

FIG. 4 shows a perspective view of ground strap 56 for securing EMD suppression chip device 54 (FIG. 3) in end cap 26 (FIG. 2) in accordance with a preferred embodiment of the present invention. First end 58 of ground strap 56 includes a tab 81 having a hole 82 through which a heat stake (not shown) formed on non-conductive platform portion 84 (FIG. 2) may be used to fasten ground strap 56 to platform portion 84 in a heat staking process. Heat staking is a process in which a thermoplastic stud (i.e., the heat stake) protruding from a first component, such as platform portion 84, is fitted into a hole of a second component, such as hole 82 of ground strap 56. The heat stake can then be deformed through softening of the heat stake to form a head which mechanically locks the components together. Although heat staking is discussed herein, those skilled in the art will recognize that ground strap 56 may be coupled to non-conductive platform portion 84 utilizing alternative fastening methodologies and fasteners.

Ground strap 56 further includes a first section 86 extending from tab 81, a second section 88 adjoining first section 86, and a third section 90 adjoining second section 88. One or more of first, second, and third sections 86, 88, 90 includes a concave region 92. The size and shape of first, second, and third sections 86, 88, 90, with concave region 92, assures that contact will be made between ground strap 56 and longitudinal surfaces 80 of EMD suppression chip device 54 (shown in ghost form). This contact ensures electrical communication between earth terminals 78 (FIG. 3) of EMD suppression chip device 54 and ground strap 56.

Figure 5:
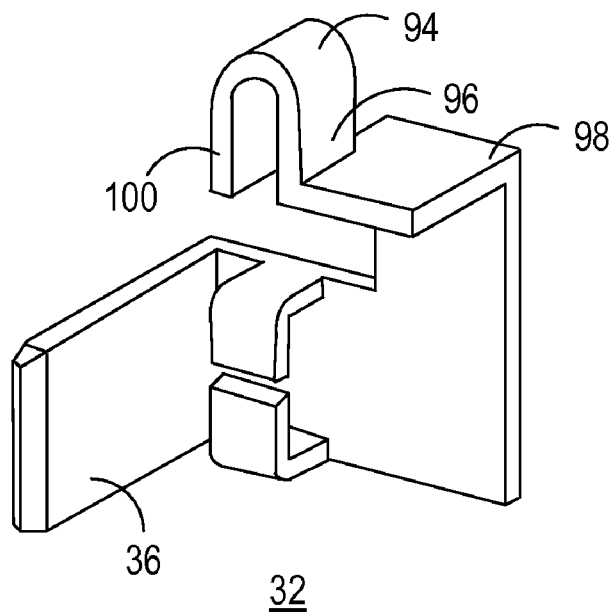
FIG. 5 shows a perspective view of a positive motor terminal of the motor assembly.

FIG. 5 shows a perspective view of positive motor terminal 32 of motor assembly 20 (FIG. 1). Positive motor terminal 32 includes prong 36 that extends from receptacle portion 40 (FIG. 2) of end cap 26 (FIG. 2). Positive motor terminal 32 further includes a resilient contact 94. Resilient contact 94 is a generally U-shaped component having a fixed end 96 attached to a body 98 of motor terminal 32 and having a free end 100. The advantages of resilient contact 94 will be discussed below.

Figure 6:
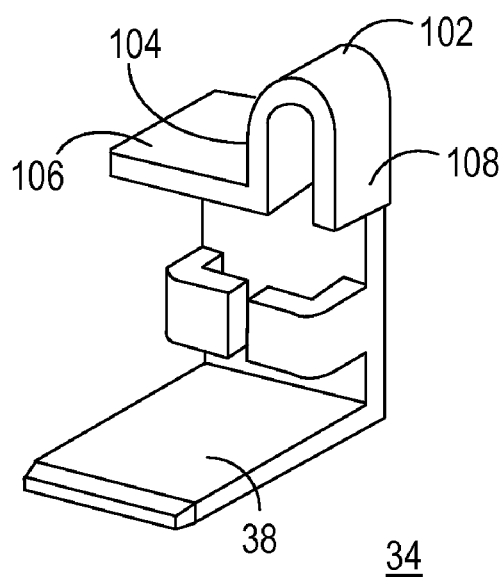
FIG. 6 shows a perspective view of a negative motor terminal of the motor assembly.

FIG. 6 shows a perspective view of negative motor terminal 34 of motor assembly 20 (FIG. 1). Like motor terminal 32, negative motor terminal 34 includes prong 38 that extends from receptacle portion 40 (FIG. 2) of end cap 26 (FIG. 2). Negative motor terminal 34 further includes a resilient contact 102. Resilient contact 102 is a generally U-shaped component having a fixed end 104 attached to a body 106 of terminal 34 and having a free end 108.

Referring to FIG. 2 in connection with FIGS. 5-6, ground strap 56 with resilient contacts 94 and 102 of motor terminals 32 and 34 largely encapsulate EMD suppression chip device 54 to hold it securely in position. Resilient contacts 94 and 102 act as springs that can compress slightly to allow placement of EMD suppression chip device 54 on non-conductive platform portion 84 of support 50. Following compression, resilient contacts 94 and 102 can rebound as necessary to form a press fit between EMD suppression chip device 54 and resilient contacts 94 and 102. This press fit functions with ground strap 56 to hold EMD suppression chip device 54 securely, while concurrently ensuring an electrical path, or electrical communication, between positive and negative motor terminals 32 and 34 and corresponding first and second input terminals 74 and 76 (FIG. 3) of EMD suppression chip device 54.

Figure 7:
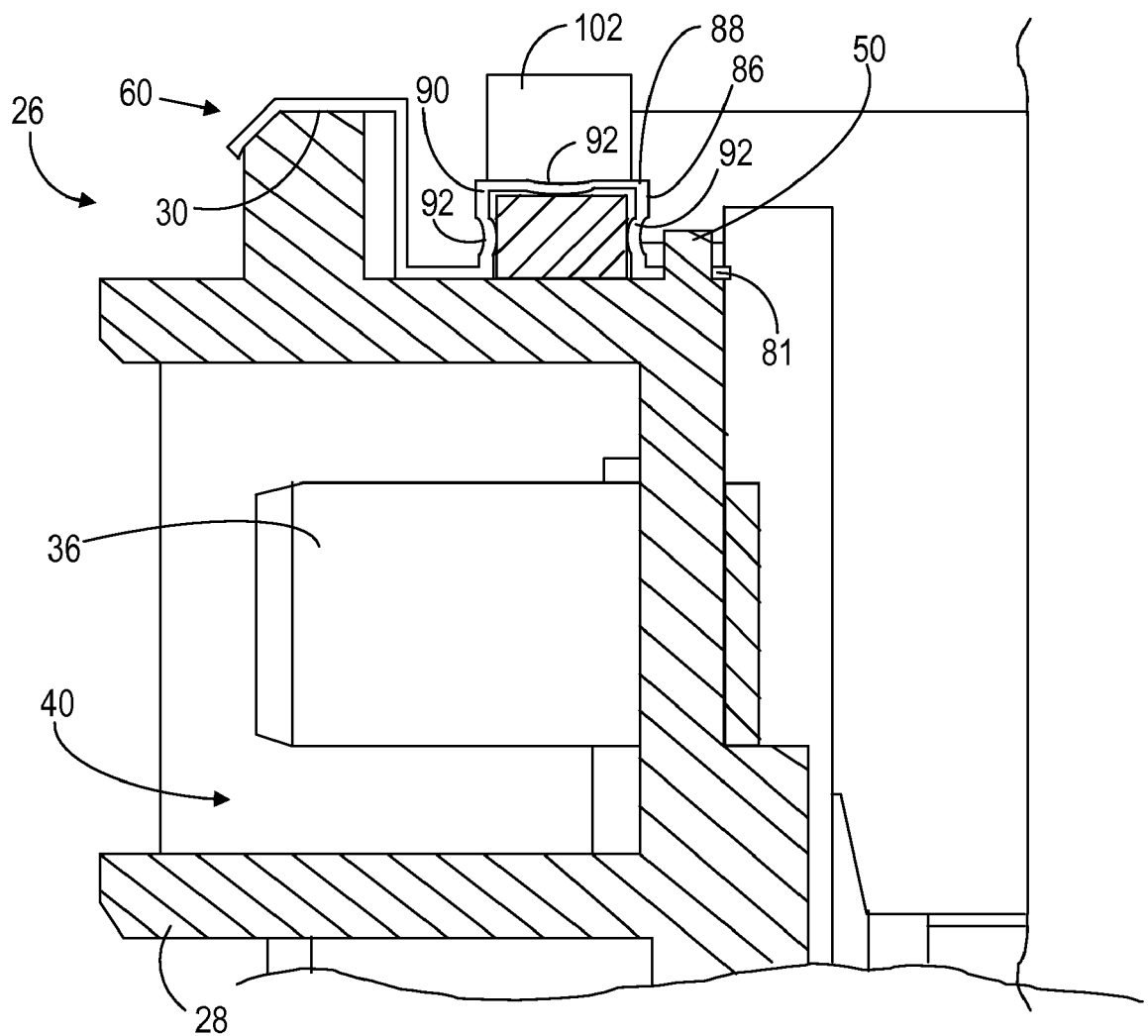
FIG. 7 shows a side sectional view of a portion of the end cap with the ground strap of FIG. 4 securing the EMD suppression chip device in the end cap.

FIG. 7 shows a side sectional view of a portion of end cap 26 with ground strap 56 securing EMD suppression chip device 54 in end cap 26. As shown, second end 60 of ground strap 56 is fitted onto peripheral edge 30 of end cap 26. In addition, ground strap 56 is in contact with EMD suppression chip device 54, especially at concave regions 92 of first, second, and third sections 86, 88, and 90 of ground strap 56. This secure fit retains EMD suppression chip device 54, even in a high vibration environment.

Figure 8:
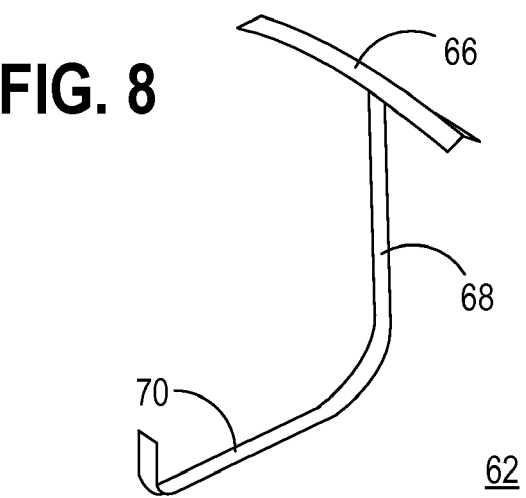
FIG. 8 shows a perspective view of another ground strap used in the motor assembly.

FIG. 8 shows a perspective view of second ground strap 62 used in motor assembly 20 (FIG. 2). As discussed in connection with FIG. 2, second ground strap 62 has first end portion 66 that fits onto peripheral edge 30 (FIG. 2) of end cap 26, intermediate portion 68 that extends along outer surface 64 (FIG. 2) of end cap 26, and second end portion 70 that is placed in electrical communication with outside diameter bearing surface 72 (FIG. 1) of motor 22 (FIG. 1). Again, second ground strap 62 improves EMD suppression performance of EMD suppression chip device 54 (FIG. 3), and can be a separate component or ground strap 62 can be insert molded when body 28 (FIG. 2) of end cap 26 is formed.

In summary, the present invention teaches of a motor assembly that includes an electromagnetic disturbance (EMD) suppression chip device for electromagnetic disturbance suppression. The EMD suppression chip device is securely retained within an end cap of the motor assembly through the inclusion of a ground strap and resilient contacts on the positive and negative terminals that largely encapsulate the EMD suppression chip device. Thus, the EMD suppression chip device can suppress electromagnetic disturbances and concurrently withstand high vibration environments.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A motor assembly comprising:
    a motor having a conductive housing;
    an end cap coupled to said motor, said end cap including a body formed from insulating material, said body including a peripheral edge that interfaces with said conductive housing;
    a first motor terminal;
    a second motor terminal, each of said first and second motor terminals located in said body;
    an electromagnetic disturbance (EMD) suppression chip device located in said body, said EMD suppression chip device having a first input terminal, a second input terminal, and an earth terminal, said first input terminal being in electrical communication with said first motor terminal, and said second input terminal being in electrical communication with said second motor terminal; and
    a conductive ground strap in electrical communication with said earth terminal, said conductive ground strap having a first end retaining said EMD suppression chip device in said end cap and having a second end fitted onto said peripheral edge of said end cap between said end cap and said conductive housing of said motor.

2. A motor assembly as claimed in claim 1 wherein said first end of said conductive ground strap is shaped to enclose at least three adjacent surfaces of said EMD suppression chip device.

3. A motor assembly as claimed in claim 2 wherein said EMD suppression chip device is an approximately rectangular prism, said first and second input terminals are located at opposing axial ends of said prism, and said earth terminal is located on a longitudinal surface spanning between said axial ends, said longitudinal surface being one of said at least three adjacent surfaces.

4. A motor assembly as claimed in claim 1 wherein:
    said end cap comprises a non-conductive platform portion upon which said EMD suppression chip device is positioned; and
    said first end of said conductive ground strap comprises a tab fastened to said platform portion.

5. A motor assembly as claimed in claim 1 wherein said conductive ground strap comprises:
    a first section in contact with a first surface of said EMD suppression chip device;
    a second section adjoining with said first section and in contact with a second surface of said EMD suppression chip device; and
    a third section adjoining with said second section and in contact with a third surface of said EMD suppression chip device.

6. A motor assembly as claimed in claim 5 wherein at least one of said first, second, and third sections comprises a concave region for assured contact with a corresponding at least one of said first, second, and third surfaces of said EMD suppression chip device.

7. A motor assembly as claimed in claim 1 wherein:
    said first motor terminal comprises a first resilient contact; and
    said second motor terminal comprises a second resilient contact, said first and second resilient contacts engaging said EMD suppression chip device to establish electric contact with respective ones of said first and second input terminals.

8. A motor assembly as claimed in claim 7 wherein said EMD suppression chip device is an approximately rectangular prism, said first and second input terminals are located at opposing axial ends of said prism, and corresponding ones of said first and second resilient contacts abut said axial ends.

9. A motor assembly as claimed in claim 1 wherein said second end of said ground strap is pinched between said peripheral edge of said end cap and said conductive housing of said motor.

10. A motor assembly as claimed in claim 1 wherein said EMD suppression chip device is inaccessible from an exterior of said motor assembly.

11. A motor assembly as claimed in claim 1 wherein each of said first and second motor terminals comprises a prong for electrical connection with a power supply, each said prong extending from an outer side surface of said body.

12. A motor assembly as claimed in claim 1 wherein said conductive ground strap is a first conductive ground strap and said motor assembly further comprises a second conductive ground strap having a first end portion fitted onto said peripheral edge of said end cap between said end cap and said conductive housing of said motor and said second ground strap having a second end portion in electrical communication with a bearing surface of said motor.

13. A motor assembly as claimed in claim 12 wherein an intermediate portion of said second ground strap between said first and second end portions extends along an outer surface of said end cap.

14. A motor assembly as claimed in claim 12 wherein said end cap and said second ground strap are combined as a single component by injection molding.

15. A motor assembly comprising:
    a motor having a conductive housing;
    an end cap coupled to said motor, said end cap including a body formed from insulating material, said body including a peripheral edge that interfaces with said conductive housing;
    a first motor terminal having a first resilient contact;
    a second motor terminal having a second resilient, each of said first and second motor terminals located in said body;
    an electromagnetic disturbance (EMD) suppression chip device located in said body, said EMD suppression chip device having a first input terminal, a second input terminal, and an earth terminal, said first and second resilient contacts of said first and second motor terminals engaging said EMD suppression chip device to so that said first resilient contact is in electrical contact with said first input terminal and said second resilient contact is in electrical contact with said second input terminal; and a conductive ground strap in electrical communication with said earth terminal, said conductive ground strap having a first end shaped to enclose at least three adjacent surfaces of EMD suppression said chip device for retaining said EMD suppression chip device in said end cap and said conductive ground strap having a second end fitted onto said peripheral edge of said end cap between said end cap and said conductive housing of said motor.

16. A motor assembly as claimed in claim 15 wherein said EMD suppression chip device is an approximately rectangular prism with said first and second input terminals being located at opposing axial ends of said prism and said earth terminal being located on a longitudinal surface spanning between said axial ends, corresponding ones of said first and second resilient contacts abut said axial ends, and said longitudinal surface is one of said at least three adjacent surfaces.

17. A motor assembly as claimed in claim 15 wherein:
said end cap comprises a non-conductive platform portion upon which said EMD suppression chip device is positioned; and
said first end of said conductive ground strap comprises a tab fastened to said platform portion.

18. A motor assembly comprising:
a motor having a conductive housing;
an end cap coupled to said motor, said end cap including a body formed from insulating material, said body including a peripheral edge that interfaces with said conductive housing;
a first motor terminal;
a second motor terminal, each of said first and second motor terminals located in said body;
an electromagnetic disturbance (EMD) suppression chip device located in said body, said chip EMD suppression device having a first input terminal, a second input terminal, and an earth terminal, said first input terminal being in electrical communication with said first motor terminal, and said second input terminal being in electrical communication with said second motor terminal;
a first conductive ground strap in electrical communication with said earth terminal, said first ground strap having a first end retaining said EMD suppression chip device in said end cap and having a second end fitted onto said peripheral edge of said end cap and pinched between said end cap and said conductive housing of said motor;
a second conductive ground strap having a first end portion fitted onto said peripheral edge of said end cap and pinched between said end cap and said conductive housing of said motor and said second ground strap having a second end portion in electrical communication with a bearing surface of said motor.

19. A motor assembly as claimed in claim 18 wherein:
said housing comprises a non-conductive platform portion upon which said EMD suppression chip device is positioned; and
said first end of said conductive ground strap comprises a tab fastened to said platform portion.

20. A motor assembly as claimed in claim 18 wherein an intermediate portion of said second ground strap between said first and second end portions extends along an outer surface of said end cap.

* * * * *